United States Patent [19]

Sparapany et al.

[11] Patent Number: 5,164,095
[45] Date of Patent: Nov. 17, 1992

[54] DITHIOCARBAMATE POLYMERS

[75] Inventors: John W. Sparapany, Bolingbrook; John H. Collins, Bloomingdale, both of Ill.

[73] Assignee: Nalco Chemical Company, Naperville, Ill.

[21] Appl. No.: 845,870

[22] Filed: Mar. 3, 1992

Related U.S. Application Data

[63] Continuation-in-part of Ser. No. 769,658, Oct. 2, 1991, abandoned.

[51] Int. Cl.⁵ .............................................. C02F 1/62
[52] U.S. Cl. .................................. 210/735; 210/912; 528/387; 252/180
[58] Field of Search ............... 210/732, 735, 736, 912, 210/913, 702; 528/373, 387; 525/540; 252/175, 180

[56] References Cited

U.S. PATENT DOCUMENTS

| | | | |
|---|---|---|---|
| 3,372,129 | 3/1968 | Phillips | 210/736 |
| 3,839,215 | 10/1974 | Mulders | 210/735 |
| 3,893,916 | 7/1975 | Argabright et al. | 210/735 |
| 3,932,274 | 1/1976 | Izumi et al. | 210/735 |
| 4,054,516 | 10/1977 | Izumi et al. | 210/736 |
| 4,670,160 | 6/1987 | Moriya et al. | 210/728 |
| 4,731,187 | 3/1988 | Moriya et al. | 210/719 |
| 5,013,451 | 5/1991 | Thompson et al. | 210/735 |
| 5,019,274 | 5/1991 | Thompson et al. | 210/735 |
| 5,026,483 | 6/1991 | Thompson et al. | 210/735 |

FOREIGN PATENT DOCUMENTS 0090551 10/1983 European Pat. Off.
0211305 2/1987

OTHER PUBLICATIONS

CA83(26):209271x.
CA87(8):53904a.
CA84(6):35067p.
CA99(26):214810g.
CA98(22):185066r.
CA108(8):61952g.
CA97(26):216850c.
CA84(12):74833e.
CA81(2):9358c.
CA89(20):163985b.
CA102(16):137489k.
CA99(26):216494f.
CA103(20):161294j.
CA103(20):161294j.
CA103(26):216332c.
CA107(2):12357n.
CA90(2):15742a.
CA91(24):193953y.
CA105(2):11502c.
112:204166z.

Primary Examiner—Stanley S. Silverman
Assistant Examiner—Neil M. McCarthy
Attorney, Agent, or Firm—Robert A. Miller; Joseph B. Barrett

[57] ABSTRACT

A water soluble ethylene dichloride ammonia polymer having a molecular weight of from 500 to 10,000 which contains from 5 to 50 mole % of dithiocarbamate salt groups. Also, disclosed is the use of these polymers in removing heavy metals from water.

3 Claims, No Drawings

DITHIOCARBAMATE POLYMERS

This is a continuation-in-part of co-pending application Ser. No. 07/769,658 filed on Oct. 2, 1991 now abandoned.

BACKGROUND OF THE INVENTION

This invention relates to water soluble dithiocarbonate salt polymers and their use in a metal scavenging process.

INTRODUCTION

As more problems are caused by contamination of rivers, waterways and the like by waste water from industrial sources, stricter regulations have been enacted to avoid contamination. It is now a mandatory requirement to control metals in waste water below their prescribed concentrations. Particularly stringent regulations have been established for heavy metals harmful to humans, such as mercury, cadium, zinc, copper and chromium.

Various processes have been proposed to remove heavy metal ions in waste water. In one process, heavy metal removal is achieved using simple dithiocarbamates (i.e. dimethyldithiocarbamate, DMDTC). There are several drawbacks to using low molecular weight dithiocarbamates. The precipitate formed can be small and settling or filtering of the precipitate from the waste water can be slow. Separate addition of flocculants and/or coagulants are often required for faster precipitation and filtration.

One proposal for improving the ability of dithiocarbamates to remove metals is to react them with polyethyleneimine polymers. Such a proposal is set forth in European patent application 009055 A1. The polyethyleneimine dithiocarbamate polymers described in this patent are water insoluble. While evidencing the ability to chelate undesirable metals, the separation of the chelated metal polymer complex is relatively slow. The action of these materials is believed to be similar to the action of water insoluble ion exchange resins.

Another example of polyethyleneimine-dithiocarbamate polymers is set forth in U.S. Pat. No. 4,670,160. In Example 8 of this patent, a polyethyleneimine resin having molecular weight of 60,000 was modified with carbon disulfide. The finished resin, while evidencing some water solubility, contained substantial quantities of insoluble materials.

Our experimental data has indicated that while polyethyleneimine resins may be modified with carbon disulfide to produce water soluble resins, the molecular weight must be about 10,000 or less. Also, the amount of carbon disulfide which may be used, e.g., 25 mole % or less.

As will be shown hereafter, the polymeric dithiocarbamate polymers of this invention are water soluble, have the ability to readily chelate undesirable heavy metals which are easily removable from aqueous systems.

THE INVENTION

The invention comprises a water soluble ethylene dichloride ammonia polymer having a molecular weight of from 500 to 10,000 which contains from 5 to 50 mole % of dithiocarbamate salt groups. The invention also comprises using these polymers to remove heavy metals from waters containing these metals.

THE ETHYLENEDICHLORIDE-AMMONIA POLYMERS

These polymers are prepared by the reaction of ethylene dichloride and ammonia. A typical reaction for producing these polymers will be illustrated hereafter. The starting ethylene dichloride ammonia polymers generally have a molecular weight range of 500–100,000. In a preferred embodiment the molecular weight is 1,500 to 10,000, with a most preferred molecular weight range being 1,500–5,000. To illustrate the preparation of such polymers, Example 1 is presented below.

EXAMPLE 1

To a pressure reactor were charged 10.8 weight % aqueous ammonia, 7.7 weight % anhydrous ammonia, 2.3 weight % and 0.3 weight % EDTA. The reactor was sealed and heated to 115°–130° C. and the Ethylene Dichloride (EDC) was pumped in. After the addition of about 0.5 weight % of EDC, 50% sodium hydroxide was added at about the same rate as the EDC and the additions were completed in 4.5 hours. Samples during the reactant addition were obtained. These samples were then concentrated under reduced pressure to remove residual EDC, $NH_3$ and vinyl chloride which is a byproduct of the reaction. Weight average molecular weights of the polymers were then measured using a liquid chromatography method and polyethylene glycol standards. A series of polymers were prepared with their make-up and properties being set forth in Table 1.

TABLE 1

| Sample # | Wt % EDC | Wt % NaOH | Mw | Mn | Poly-Dispersity | Polymer Solids |
|---|---|---|---|---|---|---|
| 1 | 12.9 | 10.4 | 1380 | 1010 | 1.3 | 41.2 |
| 2 | 15.4 | 12.3 | 1620 | 1100 | 1.5 | 46.4 |
| 3 | 17.5 | 15.2 | 1670 | 1100 | 1.5 | 41.9 |
| 4 | 20.2 | 19.3 | 1850 | 1290 | 1.6 | 43.1 |
| 5 | 22.3 | 23.1 | 2320 | 1290 | 1.8 | 37.8 |
| 6 | 24.7 | 25.7 | 2970 | 1440 | 2.0 | 47.1 |
| 7 | 26.7 | 27.4 | 3470 | 1540 | 2.2 | 41.5 |
| 8 | 29.2 | 29.2 | 4420 | 1700 | 2.6 | 42.5 |
| 9 | 32.1 | 32.8 | 6040 | 1910 | 3.1 | 37.9 |
| 10 | 33.8 | 34.6 | 7970 | 1910 | 4.2 | 36.5 |
| 11 | 36.3 | 42.6 | 92,100 | 2600 | 35.0 | 35.0 |

POLYMER MODIFICATION WITH CARBON DISULFIDE

The reaction of polyamines or polyimines with carbon disulfide to produce dithiocarbamates or their salts is well known. Such reactions are described with specificity in U.S. Pat. No. 4,731,187 which is incorporated herein by reference. The reaction between polyamines and carbon disulfide is preferably conducted in a solvent, such as water or alcohol. The reaction goes smoothly between the temperature of range of 30° to 100° C. for periods of time ranging between 1 and 10 hours. Good conversions are achieved when the temperature is between 40°–70° C. for 2 to 5 hours. These general reaction conditions apply to modifying the ethylene dichloride ammonium polymers described previously.

The mole % of dithiocarbamate salt groups placed in the finished polymer, generally is within the range of 5 to 50 mole %. The preferred range is 20–40 mole %, with a most preferred range being about 25–30 mole %.

To illustrate the conversion of the ethylene dichloride polymers to dithiocarbamate salt groups, Example 2 is presented below.

EXAMPLE 2

To 82 gm of an EDC/NH$_3$ polymer (Sample #6) were added 38 gm of 50% sodium hydroxide and 41 gm of D.I. water. The mixture was placed in a pressure reactor and 14 gm of carbon disulfide were added. The mixture was heated to 45°-50° C. for three hours. After the three hours reaction time, the mixture was cooled and a vacuum applied for 5 minutes to remove any residual carbon disulfide. The resulting solution product contained 30% modified polymer.

Using this preparative technique, the following modified polymers were prepared: (See Table 2)

TABLE 2

| Example | MW | Wt % Polymer | Wt % CS$_2$ | Mole % CS$_2$ | Wt % 50% NaOH | Comments Rxn Product |
|---|---|---|---|---|---|---|
| A | 2970 | 22.1 | 8.0 | 21 | 21.7 | Soluble |
| B | 2970 | 20.9 | 9.7 | 26 | 20.5 | Soluble |
| C | 2970 | 18.0 | 11.1 | 35 | 22.3 | Soluble |
| D | 3470 | 20.6 | 9.6 | 26 | 20.2 | Soluble |
| E | 3420 | 18.9 | 11.7 | 35 | 18.5 | Soluble |
| F | 4400 | 20.1 | 9.4 | 26 | 25.0 | Insoluble |
| G | 4092 | 22.0 | 8.0 | 21 | 17.1 | Insoluble |
| H | 4096 | 22.0 | 8.0 | 10 | 17.1 | Soluble |
| I | 1850 | 20.6 | 4.0 | 21 | 21.1 | Soluble |

As molecular weight increases the amount of carbon disulfide which can be reacted to form a water soluble reaction product decreases. With less than about 20 mole % CS$_2$ in the polymer, metal removal efficiency decreases.

DOSAGE

The amount of modified polymer of the invention capable of effectively removing metals from contaminated waters is preferably within the range of 0.2 to 2 moles of dithiocarbamate per mole of metal. More preferably, the dosage is 1 to 2 moles of dithiocarbamate per mole of metal contained in the water. This has been demonstrated to produce excellent removal results. According to one embodiment of the invention, the dosage of metal removal polymer required to chelate and precipitate 100 ml of 20 ppm soluble copper to about 1 ppm or less was 0.009 gm (9.0 mg) of polymer. The metal polymer complexes formed are self flocculating and quickly settle. These flocculants are easily separated from the treated water.

EXAMPLE 3

To illustrate the ability of the dithiocarbamate polymers set forth in Table 2 to effectively chelate and remove copper metal from a water supply, the following data is presented in Table 3:

TABLE 3

| | Residual Copper (ppm) from a Contaminated Water Supply | | | | | |
|---|---|---|---|---|---|---|
| | Polymer Dose (mg)/100 ml wastewater | | | | | |
| Polymer | 0 | 6 | 9 | 12 | 15 | 18 |
| A | 20.0 | | 1.1 | 0.09 | 0.05 | |
| B | 20.0 | 3.9 | 0.2 | 0.07 | 0.07 | 0.05 |
| C | 20.0 | 3.1 | 0.2 | 0.06 | 0.05 | 0.05 |
| D | 20.0 | 3.4 | 0.1 | 0.06 | 0.04 | 0.04 |
| E | 20.0 | 2.2 | 0.11 | 0.06 | 0 06 | 0.06 |
| H | 20.0 | | 0.14 | 0.08 | 0.08 | |

TEST METHOD FOR POLYMER METAL REMOVAL ACTIVITY

All polymers were prepared as 0.3 weight percent polymer solutions in deionized water. Copper containing water was used for testing and prepared fresh on the day of testing.

Six 100 mL samples (jars) of wastewater were placed in 150 mL beakers and set up on a gang stirrer. The samples of wastewater were mixed at 100 rpm while the polymer was dosed into the samples. The dosages used were 1, 2, 3, 4, 5, and 6 mL of polymer solutions prepared as described above. The mixing at 100 rpm was continued for a total of 10 minutes. This was then followed by a slow mix (50 rpm) for 10 minutes. After the mixing was completed, the water samples were filtered through 0.45 micron filters. The filtrate was then acidified to pH=2 with concentrated nitric acid to stop any further precipitation of the copper. Residual soluble copper was determined in the filtered water samples by atomic absorption analysis using copper standards for reference. One set of jars was run for each polymer tested. Duplicates for several polymers were run and confirmed the reported results.

It should be noted that the observed filtration rate was typically less than 1 minute for contaminated water treated with the polymer while the filtration rate for water treated with dimethyldithiocarbamate was typically greater than 2 minutes.

ADVANTAGES OF THE INVENTION

1. The EDC/NH$_3$ polymers can be derivatized with CS$_2$ under mild conditions to form water soluble polymeric dithiocarbamate polymers.
2. The polymeric dithiocarbamates can chelate and precipitate heavy metals from waste water faster than DMDTC (small molecules). This is evident from the fast formation of precipitate.
3. In addition to good chelation ability of the polymeric dithiocarbamates, the precipitate formed is larger than that produced by DMDTC, and settles very quickly. Because the precipitate is large, there is little need for coagulants or flocculants to aid in settling. Therefore, the polymeric dithiocarbamate of this invention can be a one product, one step treatment chemical for removing heavy metals from waste waters.

Tests of the invention have shown that there is a particular molecular weight which is preferred when modifying polyethylenimine with carbon disulfide. The upper limit of this preferred range is 10,000. Higher molecular weight polyethylenimine polymers resulted in insoluble reaction products when modified with carbon disulfide.

We claim:

1. A method of removing heavy metals from waters containing these metals which comprises the steps of:
   a) treating such waters with a complexing amount of a water soluble ethylene dichloride ammonia polymer having a molecular weight of from 500 to 100,000 which contains from 5 to 50 mole % of dithiocarbamate salt groups, to form a complex of these heavy metals;
   b) allowing such complexes to rapidly settle from the water as a precipitate;
   c) and, separating the precipitate from the water.
2. The method of claim 1 where the water soluble polymer has a molecular weight from 1500 to 5000 and contains from 15-50 mole % of dithiocarbamate salt groups.
3. The method of claim 1 where the water soluble polymer has a molecular weight from 1500 to 5000 and contains about 25-40% of dithiocarbamate salt groups.

* * * * *